United States Patent
Tsubaki et al.

(10) Patent No.: US 11,978,597 B2
(45) Date of Patent: May 7, 2024

(54) LIQUID COMPONENT FOR ELECTROLYTIC CAPACITOR AND ELECTROLYTIC CAPACITOR

(71) Applicants: Panasonic Intellectual Property Management Co., Ltd., Osaka (JP); Sanyo Chemical Industries, Ltd., Kyoto (JP)

(72) Inventors: Yuichiro Tsubaki, Kyoto Fu (JP); Tatsuji Aoyama, Kyoto Fu (JP); Kazuyo Saito, Osaka Fu (JP); Liyi Chen, Kyoto Fu (JP); Kengo Uchihashi, Kyoto Fu (JP)

(73) Assignees: PANASONIC INTELLECTUAL PROPERTY MANAGEMENT CO., LTD., Osaka (JP); SANYO CHEMICAL INDUSTRIES, LTD., Kyoto (JP)

( * ) Notice: Subject to any disclaimer, the term of this patent is extended or adjusted under 35 U.S.C. 154(b) by 51 days.

(21) Appl. No.: 17/783,125

(22) PCT Filed: Dec. 8, 2020

(86) PCT No.: PCT/JP2020/045670
§ 371 (c)(1),
(2) Date: Jun. 7, 2022

(87) PCT Pub. No.: WO2021/117721
PCT Pub. Date: Jun. 17, 2021

(65) Prior Publication Data
US 2023/0050288 A1    Feb. 16, 2023

(30) Foreign Application Priority Data
Dec. 9, 2019    (JP) ................. 2019-222529

(51) Int. Cl.
H01G 9/035    (2006.01)
C07F 5/02    (2006.01)
(Continued)

(52) U.S. Cl.
CPC ............. H01G 9/035 (2013.01); C07F 5/022 (2013.01); C07F 5/069 (2013.01); C07F 7/025 (2013.01); H01G 9/145 (2013.01)

(58) Field of Classification Search
CPC ........ H01G 9/035; H01G 9/145; H01G 9/025; H01G 9/028; H01G 9/0425; H01G 9/15;
(Continued)

(56) References Cited

U.S. PATENT DOCUMENTS 5,055,974 A * 10/1991 Washio ................. H01G 9/022
361/527
2014/0334066 A1* 11/2014 Sugihara ............... H01G 9/028
29/25.03
(Continued)

FOREIGN PATENT DOCUMENTS

JP    S62-213238 A    9/1987
JP    S62-213239 A    9/1987
(Continued)

OTHER PUBLICATIONS

International Search Report issued in International Patent Application No. PCT/JP2020/045670, dated Feb. 16, 2021, with English translation.

Primary Examiner — Dion R. Ferguson
(74) Attorney, Agent, or Firm — Rimon P.C.

(57) ABSTRACT

A liquid component for an electrolytic capacitor includes at least one central atom selected from the group consisting of boron, aluminum, and silicon, and a ligand having a plurality of ligand atoms bonded to the central atom. The ligand atoms are at least one selected from the group consisting of
(Continued)

oxygen and nitrogen, and are bonded to a carbon atom having no oxo group.

18 Claims, 2 Drawing Sheets

(51) Int. Cl.
    *C07F 5/06*         (2006.01)
    *C07F 7/02*         (2006.01)
    *H01G 9/145*       (2006.01)

(58) Field of Classification Search
    CPC ........ H01G 11/54; H01G 11/58; H01G 11/60; H01G 11/62; H01G 11/64; C07F 5/022; C07F 5/069; C07F 7/025
    See application file for complete search history.

(56) References Cited

U.S. PATENT DOCUMENTS

| | | | |
|---|---|---|---|
| 2020/0411251 A1* | 12/2020 | Takatani | ............... C07C 309/44 |
| 2023/0050288 A1* | 2/2023 | Tsubaki | ................. H01G 9/145 |

FOREIGN PATENT DOCUMENTS

| | | | |
|---|---|---|---|
| JP | H01-114018 A | | 5/1989 |
| JP | H03-091225 A | | 4/1991 |
| JP | H03-129717 A | | 6/1991 |
| JP | H11-067604 A | | 3/1999 |
| JP | 2004534735 A | * | 11/2004 |
| WO | 2013/094462 A1 | | 6/2013 |
| WO | WO-2013180174 A1 | * | 12/2013 ............. C07B 63/02 |

* cited by examiner

LIQUID COMPONENT FOR ELECTROLYTIC CAPACITOR AND ELECTROLYTIC CAPACITOR

CROSS-REFERENCE OF RELATED APPLICATIONS

This application is the U.S. National Phase under 35 U.S.C. § 371 of International Patent Application No. PCT/JP2020/045670, filed on Dec. 8, 2020, which in turn claims the benefit of Japanese Patent Application No. 2019-222529, filed on Dec. 9, 2019, the entire disclosures of which Applications are incorporated by reference herein.

TECHNICAL FIELD

The present disclosure relates to a liquid component for an electrolytic capacitor and an electrolytic capacitor including the same.

BACKGROUND ART

In an electrolytic capacitor including a liquid component, such as a liquid electrolyte, the liquid component can function as a practical cathode material. Various studies have been made on the composition of the liquid component.

For example, Patent Literature 1 discloses using a liquid electrolyte containing a salt of phthalic acid or borodisalicylic acid and an amine compound, for an electrolytic capacitor. Patent Literature 2 teaches an electrolytic capacitor including a conductive polymer and a conductive auxiliary liquid. The conductive auxiliary liquid contains an organic solvent having a boiling point of 150° C. or higher and an aromatic compound having at least one hydroxy group.

CITATION LIST

Patent Literature

[PTL 1] Japanese Laid-Open Patent Publication No. H11-67604
[PTL 2] International Publication No. WO2013/94462

SUMMARY OF INVENTION

Technical Problem

There has been a demand in recent years to increase the permissible ripple current of an electrolytic capacitor. When the ripple current increases, due to increased heat generation in the electrolytic capacitor, the temperature of the electrolytic capacitor tends to increase. The salt of phthalic acid or borodisalicylic acid as disclosed in Patent Literature 1 is poor in thermal stability. When a liquid electrolyte containing such a salt is used, the performance of the electrolytic capacitor deteriorates in some cases. Moreover, in the conductive auxiliary liquid as disclosed in Patent Literature 2, the pH tends to increase as the temperature of the electrolytic capacitor increases. With increase in pH, the conductive polymer deteriorates, resulting in a lowered performance of the electrolytic capacitor.

Solution to Problem

In view of the above, an aspect of the present disclosure relates to a liquid component for an electrolytic capacitor, including: at least one central atom selected from the group consisting of boron, aluminum, and silicon; and a ligand having a plurality of ligand atoms bonded to the central atom, the ligand atoms being at least one selected from the group consisting of oxygen and nitrogen, and being bonded to a carbon atom having no oxo group.

Another aspect of the present disclosure relates to an electrolytic capacitor, including: an anode body having a dielectric layer formed at a surface; a cathode body; and a conductive polymer and the aforementioned liquid component which are disposed between the anode body and the cathode body.

Still another aspect of the present disclosure relates to an electrolytic capacitor, including: an anode body having a dielectric layer formed at a surface; a cathode body; and the aforementioned liquid component which is disposed between the anode body and the cathode body.

Advantageous Effects of Invention

According to the above aspects of the present disclosure, it is possible to provide an electrolytic capacitor and a liquid component for an electrolytic capacitor which are excellent in heat resistance.

DESCRIPTION OF EMBODIMENTS

While the novel features of the invention are set forth particularly in the appended claims, the invention, both as to organization and content, will be better understood and appreciated, along with other objects and features thereof, from the following detailed description taken in conjunction with the drawings.

An electrolytic capacitor according to the present disclosure includes an anode body having a dielectric layer formed at a surface, a cathode body, and a liquid component disposed between the anode body and the cathode body. The liquid component includes at least one central atom selected from the group consisting of boron, aluminum, and silicon, and a ligand having a plurality of ligand atoms bonded to the central atom. In other words, the ligand has a plurality of ligand atoms bonded to the central atom.

The ligand atom is at least one selected from the group consisting of an oxygen atom and a nitrogen atom, and is bonded to a carbon atom having no oxo group (=O). When the ligand atom is an oxygen atom, the oxygen atom is an oxygen atom that does not form a carboxy group or a carboxy anion.

Specifically, the oxygen atom being the ligand atom can be an alcoholic or phenolic hydroxy group or alkoxy oxygen, or an oxy group. In particular, it is preferable that an alcoholic or phenolic alkoxy oxygen is bonded to the central atom, because the bond with the central atom is stable.

On the other hand, when the ligand atom is a nitrogen atom, the nitrogen atom is a nitrogen atom that forms an amino group, an amide group, an imide group, an imide anion or the like.

The central metal and the ligand constitute a coordination compound. The coordination compound includes a complex and a complex salt. The ligand may form, but not limited to, a complex anion together with the central atom. That is, the coordination compound may be a complex anion. The coordination compound may be a coordination compound (first coordination compound) formed through coordination of an organic molecule having a plurality of ligand atoms (i.e., a coordinating organic compound) to the central metal. That is, the first coordination compound has a ligand derived from such an organic molecule (coordinating organic compound). The ligand can have a structure obtainable by eliminating the hydrogen atom, hydroxy group, amino group, or imino group bonded to the ligand atom from the organic molecule.

The ligand desirably contains an electron-withdrawing substituent. Such a substituent tends to stabilize the electrons of the ligand atom of the ligand. Therefore, a product produced during hydrolysis is unlikely to cause corrosion of the electrodes of the capacitor. Examples of the electron-withdrawing substituent include a nitro group, a carboxy group, an ester group, a halogen atom (e.g., fluorine atom, chlorine atom), an acyl group, a tosyl group, a keto group, a cyano group, and a methyl sulfonyl group.

On the other hand, the ligand may contain an electron-donating substituent. Such a substituent tends to allow electrons to flow into the unoccupied orbital on the central atom and be stabilized, and thus contributes to the stability of the liquid component especially during hydrolysis or in a high humidity environment. Examples of the electron-donating substituent include an amino group, an alkyl group, an aryl group (e.g., phenyl group), and an alkoxy group.

The ligand may be derived from a polyol having, for example, an aromatic ring and at least a first hydroxy group and a group including a second hydroxy group. That is, the aforementioned organic molecule (coordinating organic compound) may be a polyol. The ligand derived from a polyol means a residue of the above polyol in which the hydrogen atom and/or the hydroxy group is excluded from the above polyol, and/or, the above polyol. The first hydroxy group may be bonded to the aromatic ring. A group including the second hydroxy group may be bonded at the ortho position with respect to the first hydroxy group in the aromatic ring. The group including the second hydroxy group may be the second hydroxy group, or an alkyl group having the second hydroxy group. Examples of the alkyl group having the second hydroxy group include an alkyl group with 1 to 4 carbon atoms. Examples of the alkyl group having the second hydroxy group include a methylol group, an ethylol group, a propylol group, or a butylol group. Preferred is a methylol group, in view of the stability of the complex anion.

More preferably, the organic molecule may be a compound represented by the following general formula (1), (2), (3), (4), (5) or (6).

[Chem. 1]

(1)

(2)

(3)

(4)

[Chem. 2]

(5)

(6)

[$R^1$, $R^2$, $R^3$, $R^4$, $R^5$ and $R^6$ each independently represent a hydrogen atom, a halogen atom, a hydroxy group, an alkoxy group with 1 to 10 carbon atoms, a carboxy group, a group with 2 to 10 carbon atoms having an ester bond, a saturated aliphatic hydrocarbon group with 1 to 24 carbon atom which may have a substituent, an unsaturated aliphatic hydrocarbon group with 2 to 24 carbon atoms which may have a substituent, or an aromatic hydrocarbon group with 6 to 14 carbon atoms which may have a substituent.]

Examples of the halogen atom include a fluorine atom, a chlorine atom, and a bromine atom.

Examples of the alkoxy group with 1 to 10 carbon atoms include a methoxy group, an ethoxy group, an n- or iso-propoxy group, an n-, sec-, iso- or tert-butoxy group, an n-pentoxy group, an n-hexoxy group, an octoxy group, a decoxy group, and a phenoxy group.

Examples of the group with 2 to 10 carbon atoms having an ester bond include an alkoxycarbonyl group with 2 to 10 carbon atoms. The alkoxycarbonyl group includes, for example, a group in which the hydrogen atom of the carboxy group is substituted by a methyl group, an ethyl group, a propyl group, a butyl group, a pentyl group, a hexyl group, a pentyl group, an octyl group, or a nonyl group.

The saturated aliphatic hydrocarbon group with 1 to 24 carbon atoms which may have a substituent includes, for example, an alkyl group with 1 to 24 carbon atoms, and a cycloalkyl group with 3 to 24 carbon atoms. Examples of the alkyl group include a methyl group, an ethyl group, an n-propyl group, an iso-propyl group, an n-butyl group, an iso-butyl group, a sec-butyl group, a tert-butyl group, an n-pentyl group, a 2-methylbutyl group, a 3-methylbutyl group, a 2-ethylpropyl group, an n-hexyl group, a 1-methylpentyl group, a 2-methylpentyl group, a 3-methylpentyl group, a 4-methylpentyl group, a 1-ethylbutyl group, a 2-ethylbutyl group, a 1-propylpropyl group, a 2-propylpropyl group, a 1-iso-propylpropyl group, a 2-iso-propylpropyl group, an n-heptyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 2,2-dimethylpropyl group, a 1-propylbutyl group, a 2-propylbutyl group, a 1-iso-propylbutyl group, a 2-iso-propylbutyl group, an n-octyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexy group, a 3-ethylhexyl group, a 4-ethylhexyl group, a 1-propylpentyl group, a 2-propylpentyl group, a 1-iso-propylpentyl group, a 2-iso-propylpentyl group, a 3-propylpentyl group, a 3-iso-propylpentyl group, a 1-butylbutyl group, a 2-butylbutyl group, a 1-iso-butylbutyl group, a 2-iso-butylbutyl group, a 1-tert-butylbutyl group, a 2-tert-butylbutyl group, a 1,1,3,3-tetramethylbutyl group, a nonyl group, and a decyl group. The alkyl group may have 1 to 20 carbon atoms, 1 to 16 carbon atoms, or 1 to 12 carbon atoms. Examples of the cycloalkyl group include a cyclopentyl group, a cyclohexyl group, a cyclopentyl group, and a cyclooctyl group. The cycloalkyl group may have 5 to 10 carbon atoms, or 5 to 8 carbon atoms.

The unsaturated aliphatic hydrocarbon group with 2 to 24 carbon atoms which may have a substituent includes, for example, an alkenyl group. Examples of the alkenyl group include a vinyl group, a propenyl group, a butenyl group, a pentenyl group, a hexenyl group, an octenyl group, a decenyl group, and an isopropenyl group. The unsaturated aliphatic hydrocarbon group may have 2 to 18 carbon atoms.

Examples of the substituent which may be included in the saturated aliphatic hydrocarbon group with 1 to 24 carbon atoms or the unsaturated aliphatic hydrocarbon group with 2 to 24 carbon atoms include a hydroxy group, an alkoxy group (e.g., alkoxy group with 1 to 4 carbon atoms), a carboxy group, a nitro group, a halogen atom, a cyano group, and an amino group.

The aromatic hydrocarbon group with 6 to 14 carbon atoms which may have a substituent includes, for example, an aryl group, an arylalkyl group (or an aralkyl group). Examples of the aryl group include a phenyl group, a tolyl group, a xylyl group, and a naphthyl group. The aryl group may have an aromatic hydrocarbon ring having 6 to 10 carbon atoms. The arylalkyl group is, for example, an alkyl group with 1 to 4 carbon atoms having an aryl group with 6 to 10 carbon atoms. Examples of the arylalkyl group include a benzyl group and a phenethyl group. Examples of the substituent include an alkyl group (e.g., alkyl group with 1 to 6 carbon atoms), a hydroxy group, an alkoxy group (e.g., alkoxy group with 1 to 4 carbon atoms), a carboxy group, a nitro group, a halogen atom, a cyano group, and an amino group.

Specifically, the polyol having the second hydroxy group bonded to the aromatic ring is exemplified by catechol, pyrogallol, gallic acid, gallic acid esters (e.g., gallic acid alkyl (an ester with an alkyl having 1 to 4 carbon atoms, etc.)), hexahydroxybenzene, 1,2-dihydroxynaphthalene, 2,3-dihydroxynaphthalene, 4,4'-(2,3-dimethyltetramethylene) dipyrocatechol, 2,3,4,4'-tetrahydroxydiphenylmethane, and the like. A substituent may be bonded to the aromatic ring of these polyols.

The polyol having the first hydroxy group and an alkyl group having the second hydroxy group (e.g., methylol group) is exemplified typically by salicyl alcohol, 2,5-dihydroxybenzyl alcohol, 2,6-bis(hydroxymethyl)-p-cresol, and the like. A substituent may be bonded to the aromatic ring of these polyols.

Examples of the substituent which may be on the aromatic ring of the polyol include the groups or atoms (excluding hydrogen atom) described above for $R^1$ to $R^6$.

The number of polyol molecules coordinated per one central atom may be one, or two or more. In view of the stability of the complex anion, a polyol in which two or more polyol molecules (e.g., two molecules or three molecules) are coordinated per two central atoms may be selected. The number of molecules corresponds to the number of ligands coordinated per one central atom.

When the central atom is boron or aluminum, for example, a tetra-coordinated complex anion can be formed. A typical example thereof is a complex anion (typically, borodicatechol, etc.) in which two diol molecules are dehydrated and coordinated to a boron atom or an aluminum atom. When the central atom is silicon, for example, a penta- or hexa-coordinated complex anion can be formed. A typical example thereof is a complex anion in which three diol molecules are dehydrated and coordinated to a silicon atom.

The electrolytic capacitor preferably further has a conductive polymer disposed between the anode body and the cathode body, in view of reducing the ESR of the electrolytic capacitor. The conductive polymer is, for example, a π-conjugated conductive polymer, and is usually doped with a dopant, in order to improve the conductivity. When the liquid component contains the first coordination compound (e.g., a complex anion), dedoping of the dopant can be suppressed, and thus, the deterioration of the conductive polymer or the reduction in the conductivity can be suppressed.

The pH of the liquid component is preferably 6 or less, more preferably 4 or less, and still more preferably 3.8 or less or 3.6 or less. By setting the pH of the liquid component to 4 or less, the deterioration of the conductive polymer can be further remarkably suppressed.

The first coordination compound (e.g., a complex anion) exhibits acidity, and therefore, can contribute to control the pH within the above range. The liquid component may further contain an acid component.

The concentration of the complex anion in the liquid component, for example, may exceed 0.1 mass %, and may be 1.0 mass % or more. By containing the complex anion in this way, the stability of the liquid component at a high temperature is significantly increased, and the heat resistance of the electrolytic capacitor is remarkably improved. However, in view of suitably maintaining the viscosity of the liquid component, the content of the complex anion in the liquid component may be, for example, 30 mass % or less, and may be 20 mass % or less.

The concentration of the complex anion is defined as the maximum amount of a complex anion that the central atom and the ligand having a plurality of ligand atoms having the aforementioned structure can form included in the liquid component. Here, the maximum amount is calculated assuming that the central atom and the ligand all form a complex ion, regardless of whether or not they actually form a complex anion. When the equivalent weight of the central atom and the equivalent weight of the ligand are different, the above maximum amount is calculated, naturally, based on the smaller one of the two.

The complex anion can quantitatively and qualitatively analyzed, for example, as follow.

<Qualitative Analysis>

First, 30 mL of the liquid component is weighed into a glass container having a sealing lid, and the infrared absorption spectrum (IR) of the liquid component in the container is measured using a predetermined measuring instrument (IRSprit [available from Shimadzu Corporation)]. Next, the container storing the liquid component is sealed and allowed to stand for a certain period of time in a high temperature environment. Thereafter, the liquid component in the container is left to cool, and then, the IR thereof is measured again. The stability of the complex anion can be evaluated from the change in the stretching vibration spectrum of the bond between the central atom and the ligand atom. It can be said that the smaller the change in the spectrum is, the higher the stability of the complex anion is.

<Quantitative Analysis>

First, 30 mL of the liquid component is weighed into a glass container having a sealing lid, and the nuclear magnetic resonance spectrum (NMR) of the liquid component in the container is measured using a predetermined measuring instrument (AVANCE III HD [available from BRUKER]), to determine an initial production ratio (G0) of the complex anion, from the peak intensity. Next, the container storing the liquid component is sealed and allowed to stand for a certain period of time in a high temperature environment. Thereafter, the liquid component in the container is left cool, and then the NMR thereof is measured again, to determine a production ratio (G1) of the produced complex anion and unreacted organic molecule. The decomposition percentage of the complex anion is determined using the formula below, from which the stability of the complex anion can be evaluated. It can be said that the smaller the decomposition percentage is, the higher the stability of the complex anion is.

Production ratio $G1$ of complex anion (%)=(Peak intensity of complex anion)/(Peak intensity of complex anion+Peak intensity of unreacted organic molecule)·100 Decomposition percentage of complex anion (%)=Initial production ratio $G0$ of complex anion (%)−Production ratio $G1$ of complex anion (%)

The liquid component may further contain at least one selected from the group consisting of a cation containing a nitrogen atom and a cation containing a phosphorus atom. These cations are considered, for example, to enhance the stability of the complex anion and increase the dissociation degree of the acid component, and thus play a role of increasing the conductivity of the liquid component. The cation containing a nitrogen atom may be an ammonium ion of various structures, and the cation containing a phosphorus atom may be a phosphonium ion. That is, the at least one selected from the group consisting of a cation containing a nitrogen atom and a cation containing a phosphorus atom is an onium cation. The content of the onium cation in the liquid component is, for example, 0.1 mass % or more, and may be 30 mass % or less.

The cation containing a nitrogen atom is, for example, at least one selected from the group consisting of a secondary ammonium ion, a tertiary ammonium ion, and a quaternary ammonium ion. For an amine that produces an ammonium ion, an aliphatic amine, an aromatic amine, a heterocyclic amine, or the like can be used. Particularly preferred is an aliphatic amine having a molecular weight of 72 to 102, in terms of the high dissociation degree.

Examples of the amine that produces an ammonium ion include methylamine, dimethylamine, trimethylamine, ethylamine, diethylamine, triethylamine, ethylenediamine, N,N-diisopropylethylamine, tetramethylethylenediamine, hexamethylenediamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These may be used singly or in combination of two or more.

The quaternary ammonium ion may be an ion of amidine. Examples of the amidine that produces an ammonium ion include acetamidine, 1-amidinopyrazole, benzamidine, and pyridine-3-carboximidamide. The amidine may have a substituent (e.g., an electron-withdrawing or electron-donating substituent as exemplified above).

The ion of amidine also includes imidazolium (i.e., imidazolium ion). The imidazolium is a cation having a 1,3-diazole ring. The imidazolium may have a substituent (e.g., an electron-withdrawing or electron-donating substituent as exemplified above). Examples of the imidazolium include an imidazolium, an imidazolium having a substituent (e.g., an alkyl group, an aryl group) at at least one of the 1-position and the 3-position. Examples of the imidazolium having a substituent at at least one of the 1-position and the 3-position include, for example, 1,3-dimethylimidazolium, 1,3-diisopropylimidazolium, 1,3-dibutylimidazolium, 1,2,3,4-tetramethylimidazolium, 1-methyl-3-propylimidazolium, 1-ethyl-3-methylimidazolium, 1-ethyl-2,3-dimethylimidazolium, 1-butyl-3-methylimidazolium, and 1-benzyl-3-methylimidazolium.

In an electrolytic capacitor that does not contain any conductive polymer (e.g., an aluminum electrolytic capacitor), it is preferable to contain an ion of amidine in the liquid component, in terms of suppressing an increase in ESR.

When the liquid component is allowed to stand at a temperature of 145° C. for 1000 hours, an increase in pH can be suppressed to 3 or less. That is, given that the pH the liquid component measured before standing at 145° C. for 1000 hours is denoted by X, and the pH measured after standing at 145° C. for 1000 hours is denoted by Y, the difference between Y and X (Y−X) can be suppressed to 3 or less. This means that the stability of the liquid component is high, and the pH is unlikely to increase even at a high temperature (i.e., unlikely to change from acidic to alkaline). It is considered that the aforementioned ligand is hardly decomposed, and hardly causes an increase of the acid component, such as carboxylic acid. Therefore, corrosion of the electrodes of the electrolytic capacitor and the like are unlikely to occur. It is also considered that the aforementioned ligand has an action of stabilizing the carboxylic acid which coexists in the liquid component.

The change in pH can be measured, specifically, by the following method.

First, 30 mL of the liquid component into a glass container having a sealing lid, and the pH (X) at 25° C. of the liquid component in the container is measured using a predetermined measuring instrument (HM-41X available from DKK-TOA Corporation). Next, the container storing the liquid component is sealed and allowed to stand in a 145° C. oven for 1000 hours. Thereafter, the temperature of the liquid component in the container is returned to 25° C., and then the pH (Y) is measured again. The change in pH can be evaluated by determining the difference between the measured values Y and X.

In order to suppress the change in pH (Y−X) to 3 or less, the first coordination compound (e.g., complex anion) may be contained in an appropriate amount in the liquid component. When an acid component is contained in the liquid component, it is preferable to suppress the usage of the carboxylic acid. The carboxylic acid, under high temperatures, is likely to cause a side reaction (e.g., esterification reaction) with a solvent contained in the liquid component or moisture entering from the outside. When the acid component is reduced by the side reaction, the pH tends to increase. Based on the above, the content of the carboxylic acid in the liquid component is desirably, for example, 5 mass % or less, more preferably 1 mass % or less.

Among carboxylic acids, an aromatic carboxylic acid is relatively stable. In particular, an aromatic carboxylic acid having at least two carboxy groups and containing at least one aromatic ring is relatively stable against esterification reaction. The aromatic carboxylic acid desirably has one or two aromatic rings (e.g., benzene ring of C6 and/or naphthalene ring of C10), in view of suppressing the increase in the viscosity of the liquid component.

The aromatic carboxylic acid is preferably a divalent to tetravalent carboxylic acid, which has higher stability, and two or more carboxy groups are desirably directly bonded at the ortho position to each other in the aromatic ring. Specifically, phthalic acid, pyromellitic acid or the like can be used as the aromatic carboxylic acid. In particular, phthalic acid is preferred, and o-phthalic acid is particularly preferred.

A second coordination compound (or a condensate (complex anion, etc.)) of a carboxylic acid and an inorganic acid (e.g., boric acid, phosphoric acid) may be used. As the second coordination compound, for example, a coordination compound of a carboxylic acid and boric acid is preferred. Specifically, as the second coordination compound, for example, borodisalicylic acid, borodiglycolic acid, borodioxalic acid, or the like can be used. Such a second coordination compound has higher thermal stability than carboxylic acid, but is easily decomposed at a high temperature of, for example, 150° C. or higher.

The complex anion and the cation (electrolyte salt) are preferably contained, in the liquid component, in an amount of 0.1 mass % or more and 50 mass % or less. This can greatly enhance the stability the liquid component at a high temperature, and can remarkably improve the heat resistance of the electrolytic capacitor. In view of suitably maintaining the viscosity of the liquid component, the content of the electrolyte salt in the liquid component, for example, may be more than 1 mass % and 30 mass % or less, and may be more than 10 mass % and 25 mass % or less.

The molar ratio of the complex anion to the cation (=complex anion/cation) is, for example, 0.5 or more and 2 or less, or 0.8 or more and 1.2 or less, and is preferably 0.9 or more and 1.1 or less. In this case, the stability of the liquid component at a high temperature is further enhanced, and the stability of the complex anion and the dissociation degree of the acid component are further increased, and thus, the conductivity of the liquid component can be further improved.

The proportion of the complex anion in the electrolyte salt is preferably 15 mass % or more or 30 mass % or more, and more preferably 50 mass % or more or 60 mass % or more. In this case, the stability of the liquid component at a high temperature can be further enhanced. The proportion of the complex anion in the electrolyte salt is 90 mass % or less, and is preferably 85 mass % or less or 80 mass % or less, more preferably 75 mass % or less or 70 mass % or less. In this case, the stability of the complex anion and the dissociation degree of the acid component are further increased, and the conductivity of the liquid component can be further increased. These lower and upper limit values can be combined in any combination.

The amount of water contained in the liquid component may be 0.1 mass % or more and 30 mass % or less, and may be 0.5 mass % or more and 30 mass % or less. Even when a relatively large amount of water is contained as above, since the first coordination compound (e.g., complex anion) is hardly hydrolyzed, the pH of the liquid component can be stably maintained. Also, an acid component like a carboxylic acid is unlikely to increase, and corrosion of the electrodes of the electrolytic capacitor and the like are unlikely to occur.

The liquid component may further contain a solvent. Any kind of solvent may be used, but it is desirable to use at least a polymer polyether-based solvent because it can improve the heat resistance of the electrolytic capacitor. Here, the weight average molecular weight (Mw) of the polymer polyether-based solvent is, for example, 150 or more. The polymer polyether-based solvent has high thermal stability and is unlikely to cause a side reaction with the ligand. Examples of the polymer polyether-based solvent include a polyalkylene glycol, such as polyethylene glycol and polypropylene glycol, a polyglycerin, and a polyether (e.g., an ether obtained by alkylating the terminal of polyalkylene glycol or polyglycerin). The viscosity of the polymer polyether-based solvent is desirably as low as possible. Therefore, the polymer polyether-based solvent desirably does not contain an aromatic ring having a rigid structure. The weight average molecular weight (Mw) of the polyethylene glycol may be, for example, 190 to 400, and may be 200 to 300.

In the present specification, the weight average molecular weight (Mw) is a value based on polystyrene as measured by gel permeation chromatography (GPC). The GPC is usually measured using a polystyrene gel column, and water/methanol (volume ratio: 8/2) as a mobile phase.

The content of the polymer polyether-based solvent contained in the liquid component may be, for example, 0.5 mass % or more, and may be 1 mass % or more, and is preferably 20 mass % or more. The content of the polymer polyether-based solvent may be 90 mass % or less.

Examples of the solvent other than the polymer polyether-based solvent include a low molecular glycol compound, such as ethylene glycol, diethylene glycol, triethylene glycol and propylene glycol, and a glycerin. It is considered that a low molecular glycol compound or a glycerin can enhance the orientation of the conductive polymer and improve the conductivity, and thus can reduce the ESR. In particular, ethylene glycol is preferred because it has a relatively low viscosity and a high thermal conductivity, and is excellent in heat dissipation.

The content of ethylene glycol in the liquid component is, for example, 3.0 mass % or more, and preferably 10 mass % or more. The content of ethylene glycol may be 90 mass % or less.

The liquid component can further contain, as a solvent, for example, a sulfone compound, a lactone compound, a carbonate compound, and the like. Examples of the sulfone compound include sulfolane, dimethyl sulfoxide, and diethyl sulfoxide. Examples of the lactone compound include γ-butyrolactone, and γ-valerolactone. Examples of the carbonate compound include dimethyl carbonate (DMC), diethyl carbonate (DEC), ethyl methyl carbonate (EMC), ethylene carbonate (EC), propylene carbonate (PC), and fluoroethylene carbonate (FEC). As the solvent, one kind may be used singly, or two or more kinds may be used in combination. In view of synthesizing the complex anion, it is preferable to use a lactone compound.

The conductive polymer disposed between the anode body and the cathode body may be synthesized by a method of imparting a solution containing a monomer, a dopant, an oxidizing agent, and the like to the dielectric layer, and subjecting it to chemical polymerization or electrolytic polymerization on site. Alternatively, a previously synthesized conductive polymer may be imparted to the dielectric layer. In this case, for example, a liquid polymer dispersion containing a conductive polymer and a polymer dopant is impregnated into the dielectric layer, so that a conductive polymer film covering at least part of the dielectric layer is formed.

Preferable examples of the conductive polymer include polypyrrole, polythiophene, and polyaniline. These may be used singly or in combination of two or more kinds thereof, and may be a copolymer of two or more kinds of monomers. In the present specification, polypyrrole, polythiophene, polyaniline and the like each mean a polymer having polypyrrole, polythiophene, polyaniline and the like, respectively, as a basic skeleton. Therefore, polypyrrole, polythiophene, polyaniline, and the like also include their derivatives. For example, polythiophene includes poly(3,4-ethylenedioxythiophene) (PEDOT) and the like. The weight average molecular weight of the conductive polymer is not limited, but is, for example, 1,000 to 100,000.

In view of suppressing the dedoping from the conductive polymer, it is desirable to use a polymer dopant (e.g., polymer anion). When the liquid component contains the first coordination compound (e.g., complex anion), the dedoping of the polymer dopant can be suppressed, and thus, the deterioration of the conductive polymer or the reduction in conductivity can be suppressed. Examples of the polymer dopant (e.g., polymer anion) include polyvinyl sulfonic acid, polystyrene sulfonic acid, polyallyl sulfonic acid, polyacrylic sulfonic acid, polymethacrylic sulfonic acid, poly(2-acrylamide-2-methylpropanesulfonic acid), polyisoprene sulfonic acid, and polyacrylic acid. These may be used singly, or in combination of two or more kinds thereof. These may be a homopolymer or a copolymer of two or more kinds of monomers. In particular, polystyrene sulfonic acid (PSS) is preferred. The weight average molecular weight of the polymer dopant is not limited, but it is preferably, for example, 1,000 to 1,000,000 because in this case, a homogeneous solid electrolyte layer can be easily formed.

In the following, the present invention will be more specifically described, based on an embodiment. The following embodiment, however, is not intended to limit the present invention.

Figure 1:
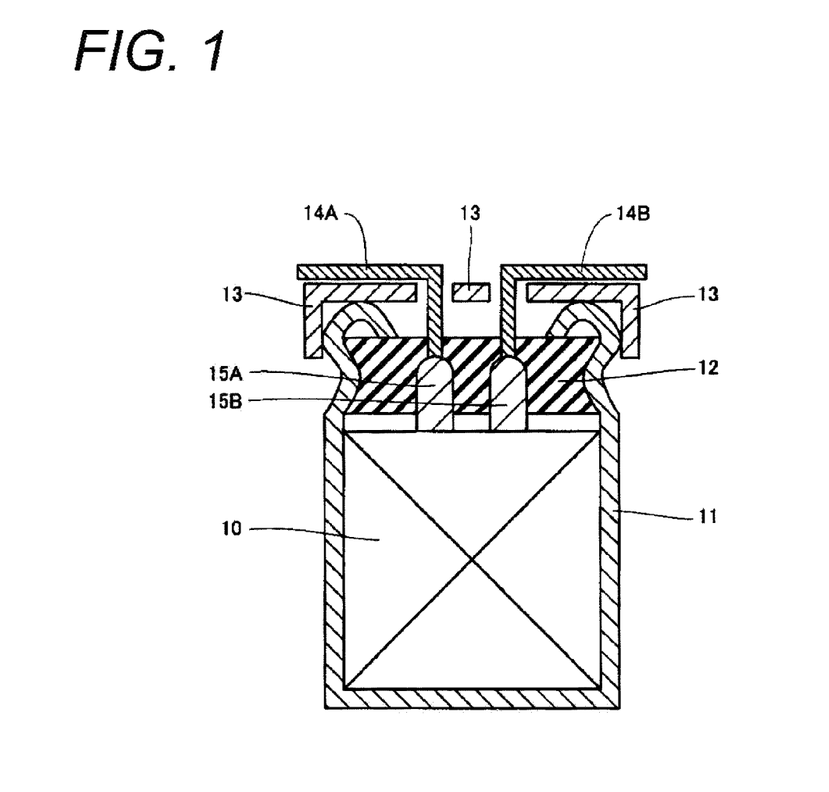
FIG. 1 A schematic cross-sectional view of an electrolytic capacitor according to an embodiment of the present disclosure.
Figure 2:
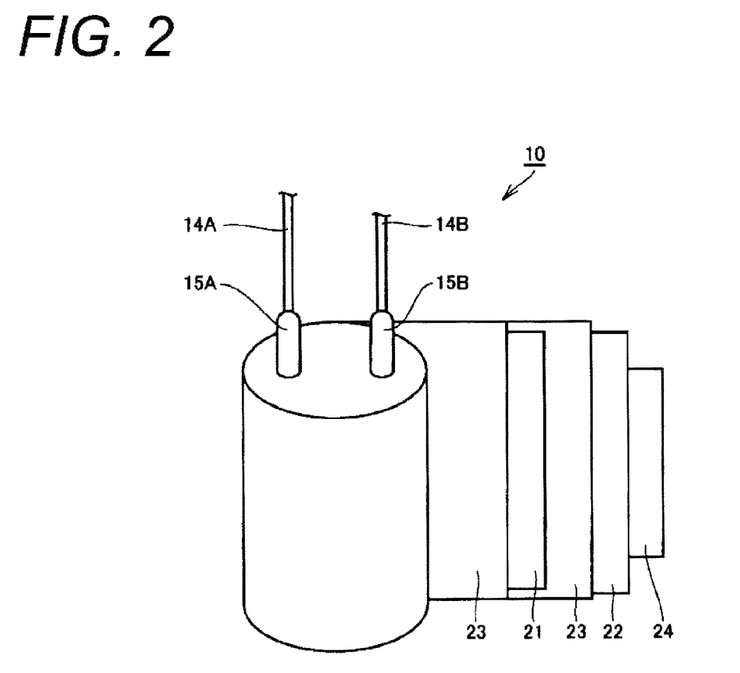
FIG. 2 A schematic diagram for explaining the configuration of a capacitor element according to the embodiment.

FIG. 1 is a schematic cross-sectional view of an electrolytic capacitor according to the present embodiment, and FIG. 2 is a partially exploded schematic diagram of a capacitor element relating to the electrolytic capacitor.

An electrolytic capacitor illustrated in FIG. 1 includes a capacitor element 10, a bottomed case 11 housing the capacitor element 10, a sealing member 12 closing the opening of the bottomed case 11, a seat plate 13 covering the sealing member 12, lead wires 14A and 14B extended from the sealing member 12 and passed through the seat plate 13, lead tabs 15A and 15B each connecting the lead wire and the electrode of the capacitor element 10, and a liquid component (not shown). The opening end of the bottomed case 11 is curled so as to be clamped to the sealing member 12.

The capacitor element 10 is produced from a wound body as illustrated in FIG. 2. The wound body is a semi-finished product of the capacitor element 10, in which no conductive polymer is disposed between an anode body 21 having a dielectric layer at its surface and a cathode body 22. The wound body is formed by winding the anode body 21 connected to the lead tab 15A and the cathode body 22 connected to the lead tab 15B, with a separator 23 therebetween. The outermost layer of the wound body is secured with a winding stop tape 24. In FIG. 2, the wound body before the outermost layer is secured is shown in a partially exploded state.

The anode body 21 includes a metal foil having a roughened surface, and a dielectric layer is formed on the roughened surface. The capacitor element 10 is formed by attaching a conductive polymer to at least part of the surface of the dielectric layer. The capacitor element 10 is housed together with the liquid component (not shown) in an outer case.

A description will be given of an example of a production method of the electrolytic capacitor.

(i) Step of Preparing Anode Body 21 Having Dielectric Layer and Cathode Body 22

A metal foil formed of a valve action metal is used as a raw material of an anode body 21 and a cathode body 22. In the case of the anode body 21, a surface of the metal foil is roughened by etching or the like, so that a plurality of irregularities are formed on the surface of the metal foil. Next, a dielectric layer is formed on the roughened surface of the metal foil by chemical conversion or the like. A surface of the cathode body 22 may be roughened, if necessary.

(ii) Production of Wound Body

The anode body 21 and the cathode body 22 are wound, with a separator 23 therebetween, into a wound body. For the separator 23, a nonwoven fabric mainly composed of synthetic cellulose or the like can be used. A winding stop tape 24 is disposed on the outer surface of the cathode body 22 positioned at the outermost layer of the wound body, to secure the end of the cathode body 22. The wound body is further subjected to chemical conversion, if necessary.

(iii) Step of Forming Capacitor Element 10

For example, a liquid polymer dispersion is impregnated into the dielectric layer, to form a conductive polymer film covering at least part of the dielectric layer. This provides a capacitor element 10 in which a conductive polymer is disposed between the anode body 21 and the cathode body 22. The step of imparting a polymer dispersion to the surface of the dielectric layer may be performed twice or more. In this case, the capacitor element 10 is then impregnated with a liquid component. In this way, an electrolytic capacitor including a conductive polymer and a liquid component can be obtained.

(iv) Step of Encapsulating Capacitor Element

The capacitor element 10 is housed together with the liquid component in a bottomed case 11, such that the lead wires 14A and 14B are positioned on the opening side of the bottomed case 11. Next, the opening of the bottomed case 11 is closed with a sealing member 12 through which each lead wire is passed, and then curled at its opening end so as to be clamped to the sealing member 12, and the seat plate 13 is placed on the curled portion. An electrolytic capacitor as illustrated in FIG. 1 is thus completed.

Although the wound electrolytic capacitor is described in the above embodiment, the present invention can be applied, without limited to the above, to other electrolytic capacitors, for example, a chip type electrolytic capacitor using a metal sintered body as the anode body, and a laminate type electrolytic capacitor using a metal plate as the anode body.

EXAMPLES

In the following, the present invention will be more specifically described, based on Examples and Comparative Examples. The present invention, however, is not limited to Examples.

<<Preparation of Liquid Component>>

Liquid components LA1 to LA11 (Examples) and LB1 to LB4 (Comparative Examples) were prepared by mixing components shown in Table 1.

[Evaluation 1]

The change in pH by heating was measured using each of the liquid components LA1 to LA11 and LB1 to LB4 in Table 1. Specifically, 30 mL of the liquid component was weighed into a glass container having a sealing lid, and the pH (X) at 25° C. of the liquid component in the container was measured using a predetermined measuring instrument (HM-41X available from DKK-TOA Corporation). Next, the container storing the liquid component was sealed and allowed to stand in a 145° C. oven for 1000 hours. Thereafter, the temperature of the liquid component in the container was returned to 25° C., and then the pH (Y) was measured again. The difference between the measured values Y and X was determined, to evaluate the change in pH. The results are shown in Table 2.

TABLE 2

| Liquid component | pH (X) | pH (Y) | Y − X |
|---|---|---|---|
| LA1 | 1.3 | 3.0 | 1.7 |
| LA2 | 2.1 | 4.0 | 1.9 |
| LA3 | 2.2 | 3.7 | 1.5 |
| LA4 | 2.1 | 3.7 | 1.6 |
| LA5 | 2.2 | 4.3 | 2.1 |
| LA6 | 4.8 | 7.2 | 2.4 |
| LA7 | 2.3 | 4.5 | 2.2 |
| LA8 | 4.8 | 7.0 | 2.2 |
| LA9 | 2.2 | 4.3 | 2.1 |
| LA10 | 2.1 | 3.4 | 1.3 |
| LA11 | 6.1 | 8.8 | 2.7 |
| LB1 | 1.6 | 4.8 | 3.2 |
| LB2 | 2.2 | 5.6 | 3.4 |
| LB3 | 5.3 | 9.4 | 4.1 |
| LB4 | 5.8 | 9.8 | 4.0 |

<<Production of Electrolytic Capacitors CA1 to CA6 and CB1 to CB6>>

A wound electrolytic capacitor having a rated voltage of 100 V and a rated electrostatic capacitance of 15 μF (diameter: 8.0 mm×L (length): 12.0 mm) was produced. A specific production method of the electrolytic capacitor will be described below.

(Preparation of Anode Body)

A 100-μm-thick aluminum foil was subjected to etching, to roughen a surface of the aluminum foil. Thereafter, a dielectric layer was formed on the surface of the aluminum foil by chemical conversion. The chemical conversion was performed by immersing the aluminum foil in an ammonium adipate solution, and applying a voltage of 180 V thereto. Thereafter, the aluminum foil was cut, to prepare an anode body.

TABLE 1

| Liquid component | Salt | Electrolyte salt (mass %) | Complex anion/ cation (molar ratio) | Complex anion/ electrolyte salt (mass %) | GBL (mass %) | EG (mass %) | SL (mass %) | PEG300 (mass %) |
|---|---|---|---|---|---|---|---|---|
| LA1 | BC/TEA | 12 | 1 | 67 | 88 | | | |
| LA2 | BC/TMI | 12 | 1 | 60 | 88 | | | |
| LA3 | B4BC/TMI | 12 | 1 | 70 | 88 | | | |
| LA4 | BP/TMI | 12 | 1 | 64 | 88 | | | |
| LA5 | BMG/TMI | 12 | 1 | 74 | 88 | | | |
| LA6 | BMG/TMI | 12 | 1 | 74 | | 88 | | |
| LA7 | BMG/TMI | 12 | 1 | 74 | | | 88 | |
| LA8 | BMG/TMI | 12 | 1 | 74 | | 44 | | 44 |
| LA9 | BPG/TMI | 12 | 1 | 75 | 88 | | | |
| LA10 | BHG/TMI | 12 | 1 | 71 | 88 | | | |
| LA11 | BC/TEA | 12 | 0.9 | 71 | 88 | | | |
| LB1 | BS/TEA | 12 | 0 | — | 88 | | | |
| LB2 | BS/TMI | 12 | 0 | — | 88 | | | |
| LB3 | FS/TEA | 12 | 0 | — | 88 | | | |
| LB4 | FS/TMI | 12 | 0 | — | 88 | | | |

BC: borodicatechol
B4BC: borodi-4-tert-butylcatechol
BP: borodipyrogallol
BMG: borodimethyl gallate
BPG: borodipropyl gallate
BHB: borodihexahydroxybenzene
BS: borodisalicylic acid
FS: phthalic acid
GBL: γ-butyrolactone
EG: ethylene glycol
SL: sulfolane
PEG300: polyethylene glycol (Mw = 300)
TEA: triethylamine
TMI: 1,2,3,4-tetramethyl imidazolium (Preparation of Cathode Body)

A 50-μm-thick aluminum foil was subjected to etching, to roughen a surface of the aluminum foil. Thereafter, the aluminum foil was cut, to prepare a cathode body.

(Production of Wound Body)

An anode lead tab and a cathode lead tab were connected to the anode body and the cathode body, respectively, and the anode body and the cathode body were wound with a separator therebetween, together with the lead tabs. An anode lead wire and a cathode lead wire were respectively connected to the ends of the lead tabs externally extended from the wound body. The resultant wound body was subjected to chemical conversion again, to form a dielectric layer at the cut end of the anode body. Next, the end on the outer surface of the wound body was secured with a winding stop tape, and thus, the wound body was completed.

(Preparation of Polymer Dispersion)

A mixed solution was prepared by dissolving 3,4-ethylenedioxythiophene and polystyrene sulfonic acid (PSS, weight average molecular weight: 100,000) used as a polymer dopant, into ion-exchanged water. Iron sulfate (III) (oxidizing agent) dissolved in ion-exchanged water was added to the mixed solution under stirring, to cause polymerization reaction. After the reaction, the obtained reaction liquid was dialyzed, to remove unreacted monomers and excessive oxidizing agent, to give polyethylene dioxythiophene doped with about 5 mass % of PSS (PEDOT/PSS).

(Formation of Solid Electrolyte Layer)

In a reduced-pressure atmosphere (40 kPa), the wound body was immersed for 5 minutes in the polymer dispersion stored in a predetermined container, and then the wound body was pulled up from the polymer dispersion. Next, the wound body impregnated with the polymer dispersion was dried in a 150° C. drying furnace for 20 minutes, to form a solid electrolyte layer composed of a conductive polymer layer covering at least part of the dielectric layer.

(Preparation of Liquid Component)

Liquid components LA1, LA2, LA12 to LA15 (Examples) and LB1 to LB4 (Comparative Examples) were prepared by mixing components shown in Table 3.

(Fabrication of Electrolyte Capacitor)

In the liquid component shown in Table 3, the above wound body including the solid electrolyte was immersed for 5 minutes in a reduced pressure atmosphere (40 kPa). Thus, the capacitor element impregnated with the liquid component was obtained. The obtained capacitor element was encapsulated, to complete an electrolytic capacitor as illustrated in FIG. 1. This was followed by aging at 130° C. for 2 hours under application of a rated voltage.

[Evaluation 2]

(Measurement of Electrostatic Capacitance and ESR)

With respect to the obtained electrolytic capacitors, the electrostatic capacitance and the initial ESR were measured. In addition, for evaluation of long-term reliability, the capacitors were allowed to stand at 145° C. for 2000 hours under application of a rated voltage, to measure an increase ratio (ΔESR) of ESR. The ΔESR is expressed by a ratio ($Z/Z_0$) of an ESR (Z) measured after standing at 145° C. to an initial value ($Z_0$).

Evaluation results are shown in Table 4. The change in pH (Y−X) determined similarly to in Evaluation 1 for each liquid component is also shown in Table 4.

TABLE 3

| Liquid component | Salt | Electrolyte salt (mass %) | Complex anion/ cation (molar ratio) | Complex anion/ electrolyte salt (mass %) | GBL (mass %) | SL (mass %) | PEG300 (mass %) |
|---|---|---|---|---|---|---|---|
| LA1 | BC/TEA | 12 | 1 | 67 | 88 | | |
| LA2 | BC/TMI | 12 | 1 | 60 | 88 | | |
| LA12 | BC/TEA | 5 | 1 | 67 | 95 | — | — |
| LA13 | BC/TMI | 5 | 1 | 60 | 95 | — | — |
| LA14 | BC/TEA | 7 | 1 | 67 | 58 | 20 | 20 |
| LA15 | BC/TMI | 7 | 1 | 60 | 58 | 20 | 20 |
| LB1 | BS/TEA | 12 | 0 | — | 88 | | |
| LB2 | BS/TMI | 12 | 0 | — | 88 | | |
| LB3 | FS/TEA | 12 | 0 | — | 88 | | |
| LB4 | FS/TMI | 12 | 0 | — | 88 | | |

BC: borodicatechol
BS: borodisalicylic acid
FS: phthalic acid
GBL: γ-butyrolactone
SL: sulfolane
PEG300: polyethylene glycol (Mw = 300)
TEA: triethylamine
TMI: 1,2,3,4-tetramethyl imidazolium

TABLE 4

| | Liquid component | Change in pH Y − X | Initial ESR (Ω) | ESR after standing at high temperature (Ω) | $Z/Z_0$ |
|---|---|---|---|---|---|
| CA1 | LA1 | 1.7 | 9 | 12 | 1.3 |
| CA2 | LA2 | 1.9 | 11 | 15 | 1.4 |
| CA3 | LA12 | 1.6 | 10 | 12 | 1.2 |
| CA4 | LA13 | 1.7 | 11 | 13 | 1.2 |
| CA5 | LA14 | 1.7 | 10 | 13 | 1.3 |
| CA6 | LA15 | 1.8 | 11 | 14 | 1.3 |
| CB1 | LB1 | 3.2 | 10 | 20 | 2.0 |
| CB2 | LB2 | 3.4 | 12 | 25 | 2.1 |
| CB3 | LB3 | 4.1 | 13 | 45 | 3.5 |
| CB4 | LB4 | 4.0 | 13 | 48 | 3.7 |

<<Electrolytic capacitors CA7 to CA10 and CB5 to CB8>>

Except for not performing the preparation of polymer dispersion and the formation of solid electrolyte, electrolytic capacitors were produced in the same manner as the electrolytic capacitors CA1 to CA4 and CB1 to CB4, and subjected to the aging. Evaluation 2 was performed using the obtained electrolytic capacitors.

Evaluation results are shown in Table 5. The change in pH (Y−X) of each liquid component is also shown in Table 5.

TABLE 5

| | Liquid component | Change in pH Y − X | Initial ESR (Ω) | ESR after standing at high temperature (Ω) | $Z/Z_0$ |
|---|---|---|---|---|---|
| CA7 | LA1 | 1.7 | 126 | 139 | 1.1 |
| CA8 | LA2 | 1.9 | 131 | 145 | 1.1 |
| CA9 | LA12 | 1.6 | 143 | 168 | 1.2 |
| CA10 | LA13 | 1.7 | 155 | 181 | 1.2 |
| CB5 | LB1 | 3.2 | 112 | 150 | 1.3 |
| CB6 | LB2 | 3.4 | 115 | 155 | 1.3 |
| CB7 | LB3 | 4.1 | 156 | 250 | 1.6 |
| CB8 | LB4 | 4.0 | 92 | 143 | 1.6 |

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The liquid component of the present disclosure is useful in an aluminum electrolytic capacitor, and an electrolytic capacitor having a conductive polymer and a liquid component.

REFERENCE SIGNS LIST

10: capacitor element, 11: bottomed case, 12: sealing member, 13: seat plate, 14A, 14B: lead wire, 15A, 15B: lead tab, 21: anode body, 22: cathode body, 23: separator, 24: winding stop tape

The invention claimed is:

1. A liquid component for an electrolytic capacitor, comprising:
    at least one central atom selected from the group consisting of boron, aluminum, and silicon;
    a ligand having a plurality of ligand atoms bonded to the central atom, and
    at least one cation selected from the group consisting of a cation containing a nitrogen atom and a cation containing a phosphorus atom, wherein:
    the ligand atoms are at least one selected from the group consisting of oxygen and nitrogen, and are bonded to a carbon atom having no oxo group,
    the central atom and the ligand form a complex anion, and
    a proportion of the complex anion in an electrolyte salt containing the complex anion and the at least one cation is 15% by mass or more and 90% by mass or less.

2. The liquid component for an electrolytic capacitor according to claim 1, wherein an increase in pH measured after standing at a temperature of 145° C. for 1000 hours is 3 or less.

3. The liquid component for an electrolytic capacitor according to claim 1, wherein a mole ratio of the complex anion to the at least one cation (=complex anion/at least one cation) is 0.9 or more and 1.1 or less.

4. The liquid component for an electrolytic capacitor according to claim 1, wherein the proportion of the complex anion in the electrolyte salt is 50% by mass or more and 90% by mass or less.

5. The liquid component for an electrolytic capacitor according to claim 1, wherein the at least one cation includes at least one selected from the group consisting of a secondary ammonium ion, a tertiary ammonium ion, and a quaternary ammonium ion.

6. The liquid component for an electrolytic capacitor according to claim 1, wherein the at least one cation includes a quaternary ammonium ion.

7. The liquid component for an electrolytic capacitor according to claim 1, wherein a content of the complex anion is 0.1 mass % or more and 30 mass % or less.

8. The liquid component for an electrolytic capacitor according to claim 1, wherein an amount of water in the liquid component is 0.1 or more and 30 mass % or less.

9. The liquid component for an electrolytic capacitor according to claim 1, wherein
    the ligand is derived from a polyol having an aromatic ring and having at least a first hydroxy group and a second hydroxy group,
    the first hydroxy group is bonded to the aromatic ring,
    a group including the second hydroxy group is bonded at an ortho position to the first hydroxy group, and
    the group including the second hydroxy group is the second hydroxy group, or an alkyl group with 1 to 4 carbon atoms having the second hydroxy group.

10. The liquid component for an electrolytic capacitor according to claim 9, wherein two or three of the ligands are coordinated per one central atom.

11. The liquid component for an electrolytic capacitor according to claim 1, further including a polymer polyether-based solvent.

12. The liquid component for an electrolytic capacitor according to claim 1, wherein the ligand includes an electron-withdrawing substituent.

13. An electrolytic capacitor, comprising:
    an anode body having a dielectric layer formed at a surface;
    a cathode body; and
    a conductive polymer and the liquid component of claim 1 which are disposed between the anode body and the cathode body.

14. The electrolytic capacitor according to claim 13, wherein the conductive polymer is doped with a dopant.

15. The electrolytic capacitor according to claim 14, wherein the dopant includes a polymer anion.

16. An electrolytic capacitor, comprising:
    an anode body having a dielectric layer formed at a surface;
    a cathode body; and
    the liquid component of claim 1 which is disposed between the anode body and the cathode body.

17. The electrolytic capacitor according to claim 13, wherein the liquid component has a pH of 6 or less.

18. The liquid component for an electrolytic capacitor according to claim 1, further including a solvent,
    wherein a concentration of the complex anion in the liquid component is more than 1.0 mass %.

* * * * *